Nov. 23, 1965

L. B. PATTISON 3,218,999

SOIL TREATING APPARATUS

Filed April 20, 1964

Inventor:
Lloyd B. Pattison
By Bair, Freeman & Molinare
Attys.

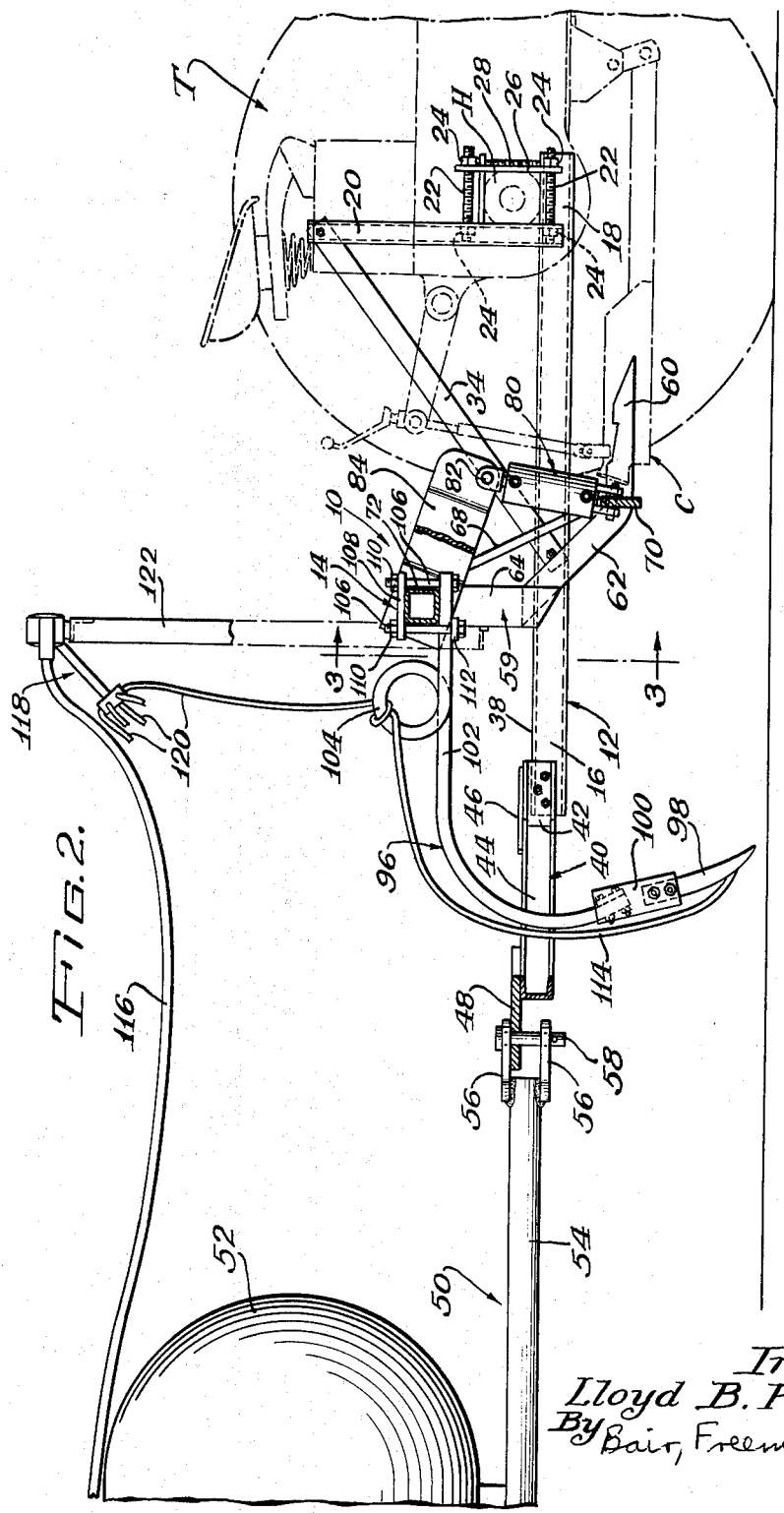

Nov. 23, 1965
L. B. PATTISON
3,218,999
SOIL TREATING APPARATUS
Filed April 20, 1964
3 Sheets-Sheet 3
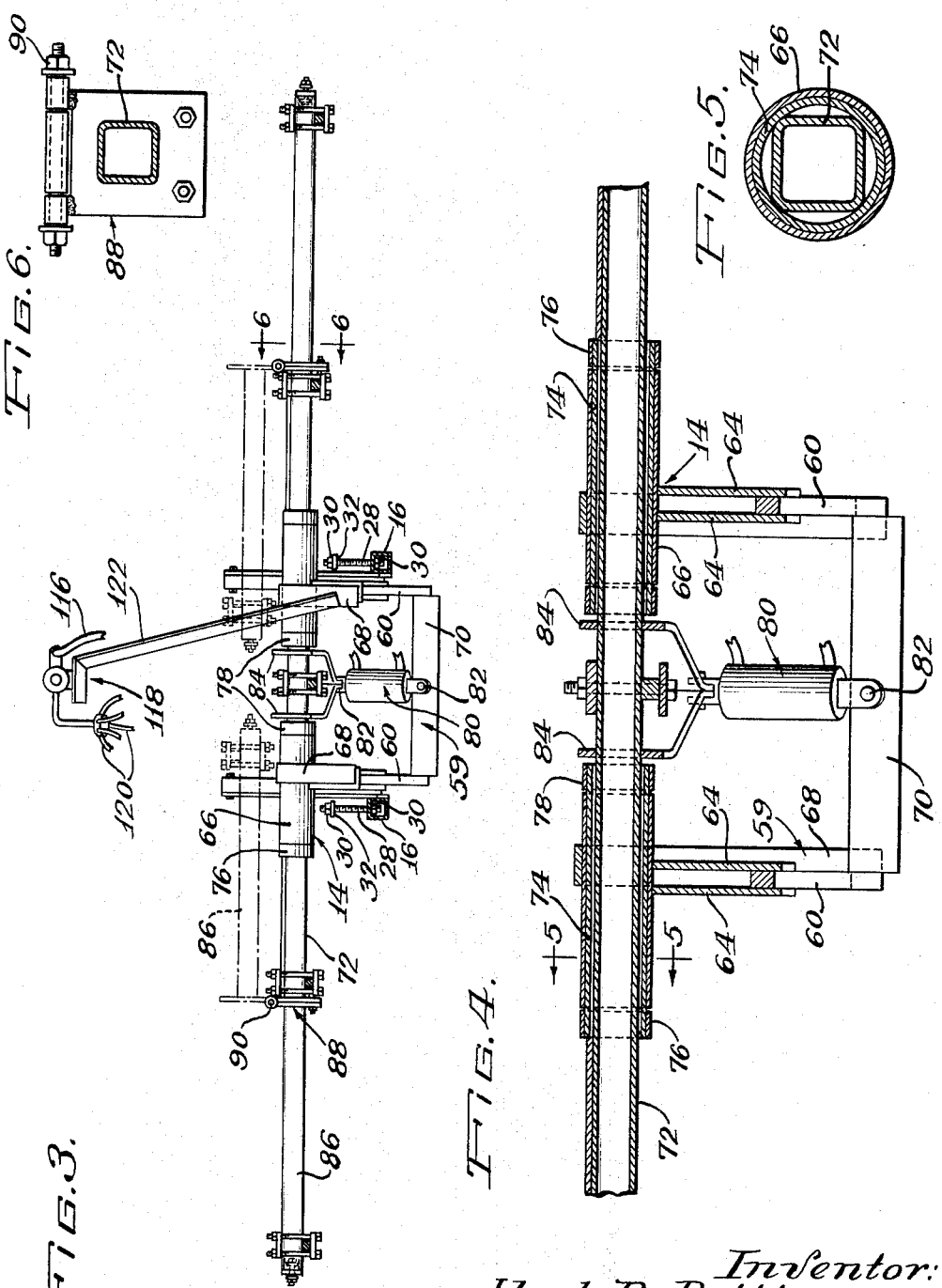
Inventor:
Lloyd B. Pattison
By Bair, Freeman & Malinare
Attys.

United States Patent Office 3,218,999
Patented Nov. 23, 1965

3,218,999
SOIL TREATING APPARATUS
Lloyd B. Pattison, Box 277, Fayette, Iowa
Filed Apr. 20, 1964, Ser. No. 361,129
1 Claim. (Cl. 111—7)

This invention relates to improved soil treating apparatus and it particularly relates to soil treating apparatus which is mounted on a tractor and is particularly adapted for applying fluid fertilizer, as pressurized ammonia gas, to the soil.

There are many types of soil treating devices available for breaking up soil and for then adding fertilizer thereto. As one example, tractor mounted tool bars having earth working tools mounted thereon are provided with means for injecting ammonia into the soil. Despite the many available types of such apparatus, the presently available devices have one or more significant disadvantages.

One of the most significant of these disadvantages is that the earth working devices which are supplied with nozzles for adding ammonia to the soil require frequent cleaning of the nozzles during operation. Specifically, as ammonia is introduced to the soil, the moisture in the soil freezes at the nozzle causing balls of dirt and humus to form thereon. These balls of dirt and humus interfere with the proper introduction of ammonia to the soil, causing a serious waste of the expensive fertilizing fluid. When the situation becomes bad enough, the operator must stop the tractor, and then manually clean each nozzle. Thus, there is not only a waste of ammonia during the fertilizing operation, but there is also a waste of the operator's time.

Another disadvantage of the prior soil treating apparatus is that the fertilizer storage tanks which are carried by the tractor are of a small size when compared to the larger ammonia storage tanks which are commonly supplied to the farmer. It is ordinary practice for the smaller tank to be filled periodically from the larger tank as the quantity of ammonia in the small mobile tank diminishes. The required periodic filling of the small mobile tank not only results in a loss of ammonia, but there is also a great loss of time in the frequent filling of the small tank from the larger tank.

In addition to the foregoing problems associated with known soil treating devices, most of the prior art devices are quite complex in construction and design and are therefore ordinarily expensive to manufacture. Also, the known soil treating devices are commonly deficient in other performance characteristics. For example, the soil treating apparatus being carried by a tractor should be readily turnable without any loss of stability and the turning radius should be minimal.

It is therefore an important object of this invention to provide soil treating apparatus wherein the disadvantages of prior art devices are substantially avoided.

It is a further object of this invention to provide improved soil treating apparatus wherein a sturdily mounted rotating tool bar assembly is provided, whereby balls of dirt that are formed around the ammonia nozzles may be automatically cleaned therefrom, simply by having the operator rotate the tools in the soil, without having the operator get on and off the tractor.

It is another object of this invention to provide improved soil treating apparatus wherein a large pressurized fluid fertilizer tank may be pulled by the tractor whereby it is unnecessary for the operator to repeatedly fill a small size fertilizer storage tank.

It is still another object of this invention to provide improved tractor movable soil treating apparatus wherein the apparatus rotates in a relatively small radius without loss of stability.

It is yet another object of this invention to provide improved soil treating apparatus having a rotatable tool bar assembly positioned intermediate the tractor and a fluid fertilizer storage tank being drawn by the tractor, whereby the operator may rotate the tool bar for performing automatic cleaning of the ammonia introducing nozzles without any interference with the assembly for pulling the storage tank.

It is still a further object of this invention to provide improved soil treating apparatus adapted to be mounted on a tractor wherein the apparatus is characterized by its simplicity and economy of construction.

Further purposes and objects of this invention will appear as the specification proceeds.

A particular embodiment of the present invention is illustrated in the accompanying drawings wherein:

FIGURE 2 is a side elevational view of the embodiment of FIGURE 1;

FIGURE 3 is a sectional view taken along the line 3—3 of FIGURE 2;

FIGURE 4 is an enlarged sectional view taken along the line 4—4 of FIGURE 1;

FIGURE 5 is an enlarged sectional view taken along the line 5—5 of FIGURE 4; and FIGURE 6 is an enlarged sectional view taken along the line 6—6 of FIGURE 3.

Figure 1:
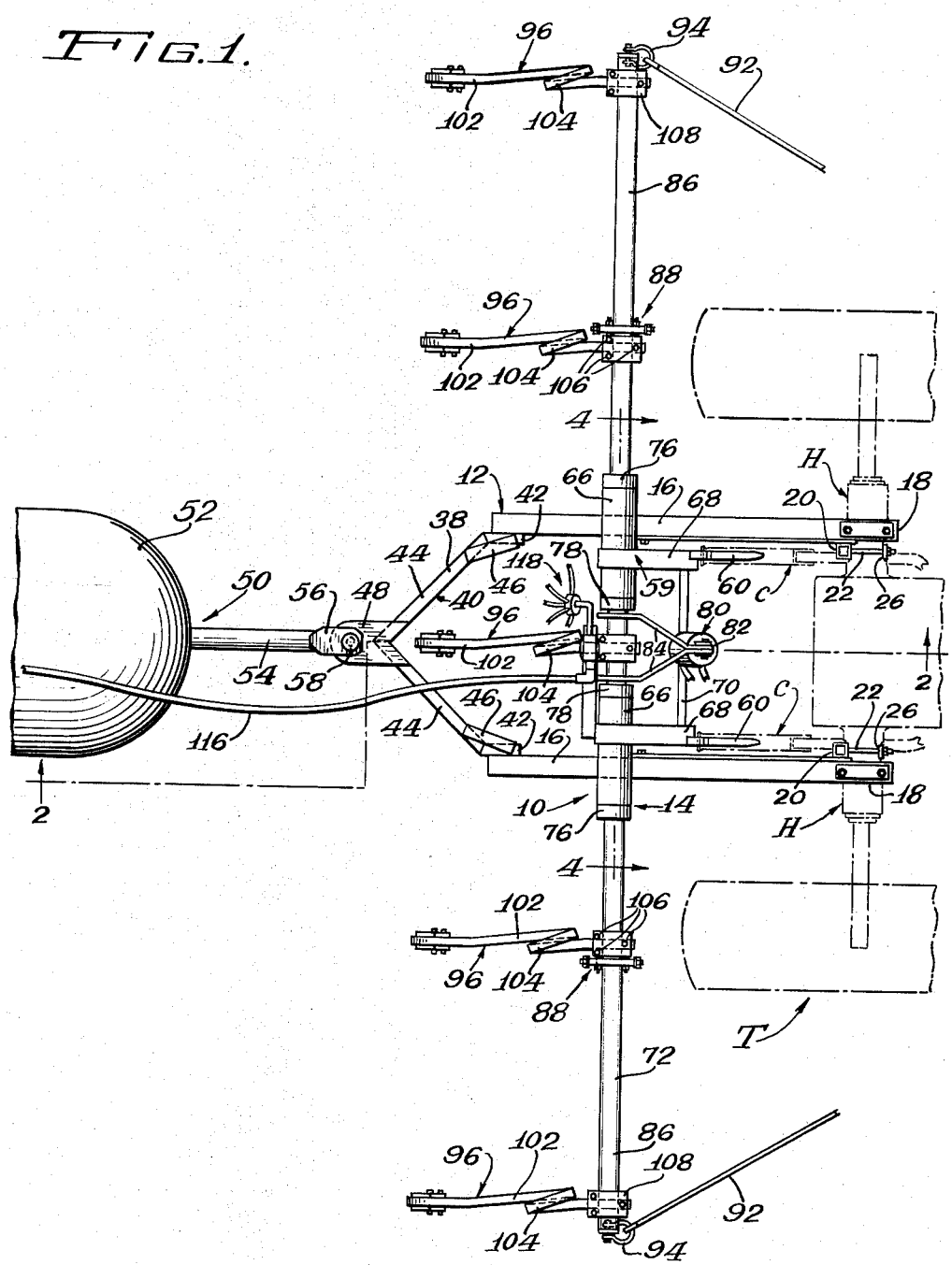
FIGURE 1 is a top plan view of my improved soil treating apparatus.

Referring to the drawings, my soil treating apparatus, generally 10, is connected to a tractor T, shown in phantom view. The soil treating apparatus 10 includes a draw bar or hitch assembly, generally 12, and a rotating tool bar assembly, generally 14, positioned above the hitch 12, both of which are carried by the tractor T.

Referring particularly to FIGURES 1 and 2, the hitch assembly 12 includes a pair of substantially parallel bars 16, which extend rearwardly from the tractor T. The forward ends 14 of the bars 16 are each provided with upright support legs 20 which are secured to the bracing bars 16 by suitable fasteners. Each upright leg 20 is adapted to receive a pair of substantially horizontally disposed and substantially vertically aligned threaded studs 22 at the lower portion thereof. The studs 22 are substantially parallel to the axis of the hitch assembly 12 and are maintained in place on a leg 20 by nuts 24 which are threaded on the opposite ends of the studs 22. Slidably positioned on each pair of threaded studs 22 is a clamping bar 26 which is positioned intermediate the forward set of nuts 24 and the upright leg 20. In a similar manner, a pair of upright substantially horizontally aligned threaded studs 28 are positioned at the forward portions 14 of the bars 16. The threaded studs 28 are maintained in place by the nuts 30 and a clamping bar 32 is vertically slidable on the spaced studs 28; the clamping bar 32 is positioned intermediate the bracing bar 16 and the upper set of nuts 30. In order to secure the hitch assembly 12 to the tractor T, the axle housing H of the tractor T is positioned between the upright legs 20 and the clamping bars 26 and also between the forward ends 14 of the bars 16 and the clamping bars 32. The nuts 24 and 30 are then tightened, whereby the clamping bars 26 and 32 are securely drawn up against the housing H whereby the hitch assembly 16 is secured to the tractor T.

In order to provide intermediate support for the bars 16, bracing bars 34 are provided. The bracing bars 34 extend from the upper ends of the upright legs 20 downwardly to a point intermediate the opposite ends of the bars 16. The bracing bars 34 are secured to both the bars 16 and the upright legs 20 by suitable fastening means.

The trailing end 38 of the hitch assembly 12 is provided with a V-shaped support frame 40 which rigidly joins the parallel hitching bars together. The support frame 40 includes a pair of spaced support members 42 which are secured, as by welding, to a pair of converging support arms 44 which may also be secured together, by welding; the support members 42 are each mounted to a spaced support bar 16 by the use of fastening means so as to provide a unitary hitch assembly 12. The joints between the support member 42 and the support arms 44 are reinforced by corner braces 46, which may be welded to the upper surfaces of the support members 42 and the support arms 44. A hitching plate 48 is fixedly mounted on the upper surface of the V-shaped tip of the support frame 40, whereby a trailer 50 for supporting a pressurized fluid fertilizer tank 52 may be connected thereto. The hitch bar 54 of the tank trailer 50 includes spaced upper and lower hitching plates 56. In order to secure the hitch bar 54 to the hitch assembly 12, a removable pin 58 is inserted into apertures provided in the hitching plates 56 of the hitch bar 54 and in the hitch plate 48 of the hitch assembly 12.

In my construction, the provision of the hitch assembly 12 enables a large capacity nurse tank 52 to be drawn by the tractor T, in contrast to prior constructions wherein small applicator tanks are utilized. The use of the large tanks, generally having a capacity of about 500 gallons, enables the operator to perform the fertilizing operations without repeatedly filling the small applicator tank from the large nurse tank, which results in a loss of fertilizer and a loss in time. Also, my economically constructed hitch assembly 12 enables the large supply tank 52 to be drawn by the tractor T, without interfering with the operation of the tool bar assembly 14, to be hereinafter described in greater detail. The trailer 50 and tank 52 are positioned in close proximity to the tractor T so as to substantially avoid any possible upward tipping of the tractor T, due to the weight of the tank 52 and trailer 50.

The rotating tool bar assembly 14 includes a pair of forwardly projecting arms 60 which connect the assembly 14 to the conventional connection means C, provided on the tractor T. As best shown in FIGURES 2 and 4, the arms 60 include upwardly angled portions 62. At the ends of the upwardly angled portions 62, upright bearing suport members 64 are secured thereto, as by welding. The upright support members 64 are in turn secured in a similar manner to the tubular outer elongated bearing members 66. A pair of generally inverted, U-shaped reinforcing bars 68 are provided; one leg of each bar 68 extends from the trailing end of the bearing support members 64, and passes around the upper surface of the bearing member 66 and the other leg of the bar 68 extends downwardly and is secured to the hydraulic cylinder support bar 70. Thus, a tool bar support frame 59 is provided for securement of the assembly 14 to the tractor T, while it also provides rotatable support for the tool bar 72.

The elongated rotating tool bar 72 passes through both of the hollow or tubular, generally circular bearing members 66 and are rotatable with respect thereto. The tool bar 72 is of generally square tubular cross section, as shown in FIGURE 5, and has a pair of inner elongated bearing members 74 secured therearound. Retaining rings 76 are positioned on the outer ends of the inner bearing members 74, the rings 76 and bearing members 74 being secured to the tool bar 72. Retaining rings 78 are positioned at the opposite ends of the bearing members 74 and are also secured to the tool bar 72. The retaining rings 76 and 78 maintain the tool bar 72 in proper rotating alignment, while the inner bearing members 74 and the outer bearing members 66 provide for rotation of the tool bar 72 with respect to the support frame 59.

In order to effect rotation of the tool bar 72, hydraulic cylinder means 80 are provided. A hydraulic cylinder 80 is pivotably carried by the cylinder support bar 70, at the center portion thereof. The outer reciprocable end 82 of a piston rod is pivotably secured to a pair of connecting arms 84. Each arm 84 converges inwardly to meet the other arm 84, at the pivot connection of each arm with the outer end 82 of the piston rod. The opposite ends of the connecting bars 84 are secured to the rotatable tool bar 72, as by welding. As the piston rod moves inwardly and outwardly, the pivot connection of the reciprocating piston rod with the connecting bars 84 permits the connecting bars 84 to rotate the tool bar 72.

Referring to FIGURES 3 and 6, it is highly desirable that the outer ends 86 of the rotating tool bar 72 be hingedly mounted to the main portion of the tool bar 72. Hinges 88 having pivot pins 90 are secured to the main body of the tool bar 72, while each of the outer ends 86 is secured to a hinge 88. Thus, the outer ends 86 of the tool bar 72 are pivotable about a horizontal axis which is transverse to the axis of the tool bar 72, whereby the outer ends 86 may be positioned against the upper surface of the main part of the tool bar 72. By providing rotatable outer ends 86, the apparatus may be readily transported through relatively narrow openings; also, the pivotable outer ends contribute to ease of storage. In order to provide additional stability for the mounting of the tool bar assembly 14 on the tractor T, ends of the cables 92 are secured to the brackets 94 positioned at the extremities of the tool bar assembly 72, while opposite ends of the cables 92 are secured to the tractor T. Suitable fasteners are provided for securing the hinge plates together so as to lock the outer ends 86 in place while in the operating position.

My rotating tool bar assembly 14 is adapted to receive a plurality of earth working tools, generally 96, laterally spaced from the high support bars 16 and which tools are individually positioned and adjustable on the bar 72. An earth working tool assembly 96 includes a knife or blade 98 for breaking up the soil and a knife clamp 100 which is provided for securing the knife 98 to a springable support shank 102. The knife 98 is secured to the clamp 100 by fasteners, and in a similar manner, the clamp 100 is secured to the springable support shank 102 by suitable fasteners. The spring support shank 102 includes a loop 104 therein and provides resilient mounting for each knife 98, whereby the knife 98 moves so that little or no damage is done to the knife 98 by rocks or stones.

The spring shank 102 includes a substantially horizontal portion, which has the loop 104, and a downwardly and somewhat forwardly inclined portion which receives the knife 98 and knife clamp 100. Each shank 102 is secured to the tool bar 72 by means of threaded studs 106 and a clamping bar 108. The substantially square tool bar 72 is positioned intermediate the forward end of the shank 102 and the clamping bar 108. Nuts 110 are provided for tightening the clamping bar 108 against the upper surface of the tool bar 72. One of the threaded studs 106 passes through the forward end of the shank 102 while the other two studs 106 pass through a bar 112, which is positioned rearwardly of the bar 72 and on the underside of the shank 102. By tightening each of the nuts 110 against the clamping bar 108, the springable support shank 102 is drawn up tightly against the lower surface of the rotating tool bar 72. The position of the tool assemblies 96 may be readily adjusted on the bar 72 merely by loosening the nuts 110 and sliding each assembly 96 longitudinally of the tool bar 72 until it is at the desired position.

Each of the knives 98 have secured thereto nozzles or conduits 114 which are provided for introducing the fertilizer, as ammonia, to the soil. The tip ends of the conduits 114 are positioned closely adjacent the tip ends of the knives 98 and rearwardly thereof, whereby as the soil is broken up by the knife 98, ammonia is being introduced into the soil. A supply line or tube 116 extends from the pressurized supply tank 52 to a distributor assembly 118 which properly distributes the appropriate quantity of ammonia to each of the tubes 120, which in turn pass the ammonia to the nozzles 114. The distributor assembly 118 is mounted for convenience on an upright support 122, which is secured to the tool bar frame 59.

In locating the rotating tool bar assembly 14 with respect to the draw bar or hitch 12, the tool bar assembly 14 is positioned intermediate the tractor T and the trailer 50 and tank 52, whereby the operator may readily view the operation of the soil treating apparatus. By the manipulation of suitable hydraulic control means (not shown) the operator may rotate the tool bar 72 through the cylinder 80 in order to pivot the blades 98 in the soil, whereby any build-up of dirt or humus on the tip ends of the conduits 114 are automatically removed therefrom. As a result, the operator is no longer required to get on and off the tractor T in order to clean the ammonia nozzles. Also, very little ammonia is lost in the fertilizing operation since as soon as the operator notices a loss of fertilizer due to a build-up of dirt on the nozzles, the tool bar 72 is rotated. Furthermore, the hitch assembly 12 does not interfere with the operation of the tool bar assembly 14 since the spaced bars 16 are positioned intermediate the earth working tool assemblies 96 and are positioned substantially outward of the tool bar support frame 59. Thus, there is no interference between the hitch assembly 12 and the tool bar assembly 14. Of further importance, the construction of my soil treating apparatus is highly simple and economical and yet is highly efficient in operation.

While in the foregoing, there has been provided a detailed description of a particular embodiment of the present invention, it is to be understood that all equivalents obvious to those having skill in the art are to be included within the scope of the invention as claimed.

What I claim and desire to secure by Letters Patent is:

Soil treating apparatus for mounting on a tractor, said apparatus comprising a horizontally disposed hitch mounted on said tractor, said hitch including a pair of spaced support bars affixed to said tractor, a trailing support frame joining said support bars, a mobile pressurized fluid fertilizer supply tank pivotably and removably connected to said trailing support frame, a tool bar support detachably mounted on said tractor, said tool bar support including a pair of substantially parallel support arms, a cross bar between said support arms, elongated outer bearing members carried by each of said support arms, a rotatable tool bar on said support positioned above said hitch assembly, elongated inner bearing members fixed to said tool bar and disposed within and coextensive with said outer bearing members, means for retaining said inner and outer bearings in operative relationship, so as to provide for sturdy rotatable mounting for said tool bar, said tool bar being positioned intermediate said tank and said tractor, springably mounted earth working tools, clamps for individually and adjustably securing said earth working tools on said tool bar, said tools being laterally spaced outwardly from said spaced support bars, hydraulic cylinder means carried by said cross bar and coupled to said tool bar whereby said earth working tools may be pivoted into and away from the soil upon operation of said hydraulic cylinder means, conduit means positioned adjacent each of said earth working tools and carried rearwardly thereof, and means communicating with said conduit means for supplying fluid fertilizer from said fertilizer tank through said conduit means whereby said fluid fertilizer is introduced to the soil.

References Cited by the Examiner
UNITED STATES PATENTS

| | | | |
|---|---|---|---|
| 1,264,441 | 4/1918 | Rue. | |
| 2,649,061 | 8/1953 | Hawkins | 111—6 |
| 2,731,901 | 1/1956 | Tye | 11—7 X |
| 2,804,034 | 8/1957 | Hunter | 111—7 |
| 2,857,863 | 10/1958 | Jessen | 111—7 |

ABRAHAM G. STONE, *Primary Examiner.*

WILLIAM A. SMITH, III, *Examiner.*